(12) United States Patent  (10) Patent No.: US 8,401,971 B2
Harada  (45) Date of Patent: Mar. 19, 2013

(54) DOCUMENT PROCESSING APPARATUS AND DOCUMENT PROCESSING METHOD

(75) Inventor: Koji Harada, Yokohama (JP)

(73) Assignee: Canon Kabushiki Kaisha (JP)

( * ) Notice: Subject to any disclaimer, the term of this patent is extended or adjusted under 35 U.S.C. 154(b) by 647 days.

(21) Appl. No.: 12/604,461

(22) Filed: Oct. 23, 2009

(65) Prior Publication Data

US 2010/0104130 A1  Apr. 29, 2010

(30) Foreign Application Priority Data

Oct. 24, 2008 (JP) .................................. 2008-274869
Jul. 28, 2009 (JP) .................................. 2009-175801

(51) Int. Cl.
*G06F 21/00* (2006.01)
*G02F 1/035* (2006.01)

(52) U.S. Cl. .............................................. 705/50; 385/3

(58) Field of Classification Search ..................... 705/50; 385/3.28

See application file for complete search history.

(56) References Cited

U.S. PATENT DOCUMENTS

| 4,998,626 | A | 3/1991 | Ota | |
| 7,039,215 | B2 * | 5/2006 | Suzaki | 382/100 |
| 8,064,103 | B2 * | 11/2011 | Harada | 358/3.28 |
| 2004/0001606 | A1 * | 1/2004 | Levy | 382/100 |
| 2004/0093498 | A1 * | 5/2004 | Noridomi et al. | 713/176 |
| 2005/0039021 | A1 * | 2/2005 | Alattar et al. | 713/176 |
| 2010/0103470 | A1 * | 4/2010 | Harada | 358/3.28 |

FOREIGN PATENT DOCUMENTS

JP 2002-232679 A 8/2002

OTHER PUBLICATIONS

Specification and drawings of U.S. Appl. No. 12/604,475, filed Oct. 23, 2009, "Document Processing Apparatus and Document Processing Method", Koji Harada, pp. 1-46.
Specification and drawings of U.S. Appl. No. 12/604,483, filed Oct. 23, 2009 "Document Processing Apparatus and Document Processing Method", Masanori Yokoi, pp. 1-52.
"Fundamentals of Digital Watermaking—New Technology for Protection of Multimedia Contents," Kineo Matsui, Morikita Publishing Co., Ltd., p. 198-p. 199, (Partial English translation). Cited in related co-pending U.S. Appl. No. 12/604,475, filed Oct. 23, 2009 and U.S. Appl. No. 12/604,483, filed Oct. 23, 2009.

* cited by examiner

*Primary Examiner* — Charles C Agwumezie
(74) *Attorney, Agent, or Firm* — Rossi, Kimms & McDowell LLP

(57) ABSTRACT

Character spacing values in a document image are extracted and a variance is calculated for fluctuations in the character spacing values. When the calculated variance is lower than a preset threshold value, the document image is determined as having watermark information embedded therein. Such use of the variance in the character spacing values enables high-speed determination of the presence or absence of character-spacing watermark information. At this time, it is possible to speed up the determination by using only some character spacing values in the document, instead of using all character spacing values.

15 Claims, 12 Drawing Sheets

FIG. 4

WATERMARKED DOCUMENT

| CHARACTER SPACING VALUE | DIFFERENCE (ABSOLUTE VALUE) | DEVIATION | SQUARE OF DEVIATION |
|---|---|---|---|
| 17 | | | |
| 10 | 7.0 | −0.67 | 0.44 |
| 12 | | | |
| 20 | 8.0 | 0.33 | 0.11 |
| 17 | | | |
| 9 | 8.0 | 0.33 | 0.11 |
| 19 | | | |
| 11 | 8.0 | 0.33 | 0.11 |
| 20 | | | |
| 13 | 7.0 | −0.67 | 0.44 |
| 17 | | | |
| 9 | 8.0 | 0.33 | 0.11 |
| AVERAGE Ave: | 7.67 | VARIANCE V: | 0.22 |

FIG. 5

ORDINARY DOCUMENT

| CHARACTER SPACING VALUE | DIFFERENCE (ABSOLUTE VALUE) | DEVIATION | SQUARE OF DEVIATION |
|---|---|---|---|
| 13 | | | |
| 14 | 1.0 | −2.00 | 4.00 |
| 15 | | | |
| 17 | 2.0 | −1.00 | 1.00 |
| 11 | | | |
| 15 | 4.0 | 1.00 | 1.00 |
| 19 | | | |
| 11 | 8.0 | 5.00 | 25.00 |
| 16 | | | |
| 17 | 1.0 | −2.00 | 4.00 |
| 14 | | | |
| 12 | 2.0 | −1.00 | 1.00 |
| AVERAGE Ave: | 3.0 | VARIANCE V: | 6.00 |

WATERMARKED DOCUMENT

| CHARACTER SPACING VALUE | DIFFERENCE (ABSOLUTE VALUE) | DEVIATION | SQUARE OF DEVIATION |
|---|---|---|---|
| 17 | | | |
| 10 | 7.0 | −0.60 | 0.36 |
| 12 | | | |
| 20 | 8.0 | 0.40 | 0.16 |
| 17 | | | |
| 9 | 8.0 | 0.40 | 0.16 |
| 19 | | | |
| 11 | 8.0 | 0.40 | 0.16 |
| 20 | | | |
| 13 | 7.0 | −0.60 | 0.36 |
| 10 | | | |
| 60 | 50.0 | 42.40 | 1797.76 |
| AVERAGE Ave: | 7.6 | VARIANCE V: | 0.24 |

PUNCTUATION MARK SECTION {  (bracketing rows with 10, 60)

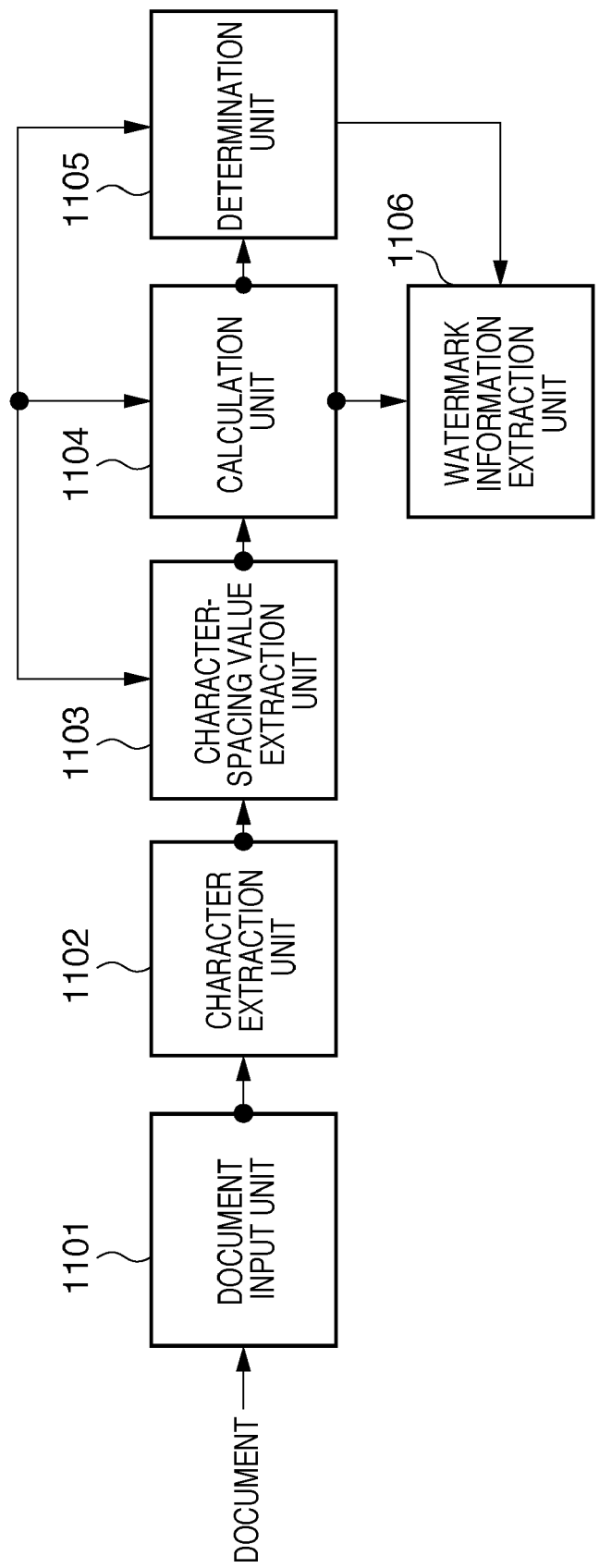

DOCUMENT PROCESSING APPARATUS AND DOCUMENT PROCESSING METHOD

BACKGROUND OF THE INVENTION

1. Field of the Invention

The present invention relates to a document processing apparatus and a document processing method, and in particular relates to a document processing apparatus that determines whether or not a document image has watermark information embedded therein by the use of character spacing, and a document processing method therefor.

2. Description of the Related Art

In order to invisibly include information such as copyright notices or copy restrictions in a document image, methods for embedding information by slightly changing character spacing that is a blank length between characters have been well-known (e.g. Japanese Patent Laid-Open No. 2002-232679). Hereinafter, such information that has been embedded by the use of character spacing is referred to as a character-spacing watermark.

As an example of information embedding rules using character spacing, for example, a rectangle circumscribing each character and a single pair of distances between such circumscribed rectangles, that is, character spacing values P and S, are first sequentially extracted, and then in each pair, either "0" or "1" is defined according to the sizes of the character spaces. Such a data string of "1"s and "0"s represents a character-spacing watermark.

Such a character-spacing watermark embedded in a document image is extracted as follows. First, a rectangle circumscribing each character and a pair of distances between such circumscribed rectangles, that is, character spacing values P and S, are extracted, and then, the high and low of the character spacing values P and S are determined for each pair so that whether the information is "0" or "1" is determined according to the rules used at the time of embedding. Thereafter, a data string connecting such obtained information of "0"s and "1"s is verified so as to first determine the presence or absence of watermark information, and when it is determined that watermark information is present, the information is extracted.

However, in the above-described conventional character-spacing watermark embedding method, the presence or absence of watermark information can be determined only after the process for extracting a data string of "0"s and "1"s has been completed; therefore, it takes considerable processing time to determine the presence or absence of watermark information.

For example, in the case where a copying machine controls copy permission based on watermark information, it is required to determine the presence or absence of watermark information in as short a time as possible in order to prevent a delay from occurring in a series of copy operations.

SUMMARY OF THE INVENTION

The present invention has been made in view of the above-described problems and provides a document processing apparatus that enables high-speed determination of the presence or absence of character-spacing watermark information in a document image, and an image processing method therefor.

According to the first aspect of the present invention, a document processing apparatus that determines whether or not a document image has watermark information embedded therein by use of character spacing, comprises: an input unit adapted to input a document image; a character-spacing value extraction unit adapted to extract character spacing values in the document image; a calculation unit adapted to calculate fluctuations in the character spacing values; and a determination unit adapted to determine whether or not the document image has watermark information embedded therein by comparing a value of the fluctuations calculated by the calculation unit with a preset threshold value.

According to the second aspect of the present invention, a document processing method for determining whether or not a document image has watermark information embedded therein by use of character spacing, comprises: an input step of inputting a document image; a character-spacing value extraction step of extracting character spacing values in the document image; a calculation step of calculating fluctuations in the character spacing values; and a determination step of determining whether or not the document image has watermark information embedded therein by comparing a value of the fluctuations calculated in the calculation step with a preset threshold value.

Further features of the present invention will be apparent from the following description of exemplary embodiments with reference to the attached drawings.

BRIEF DESCRIPTION OF THE DRAWINGS

FIG. 4 is a diagram illustrating an example of the calculation of fluctuations in a watermarked document according to the first embodiment.

FIG. 5 is a diagram illustrating an example of the calculation of fluctuations in an ordinary document according to the first embodiment.

FIGS. 11A and 11B are block diagrams illustrating a fundamental functional configuration of a document processing apparatus according to the third embodiment.

DESCRIPTION OF THE EMBODIMENTS

Embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

First Embodiment

Figure 3:
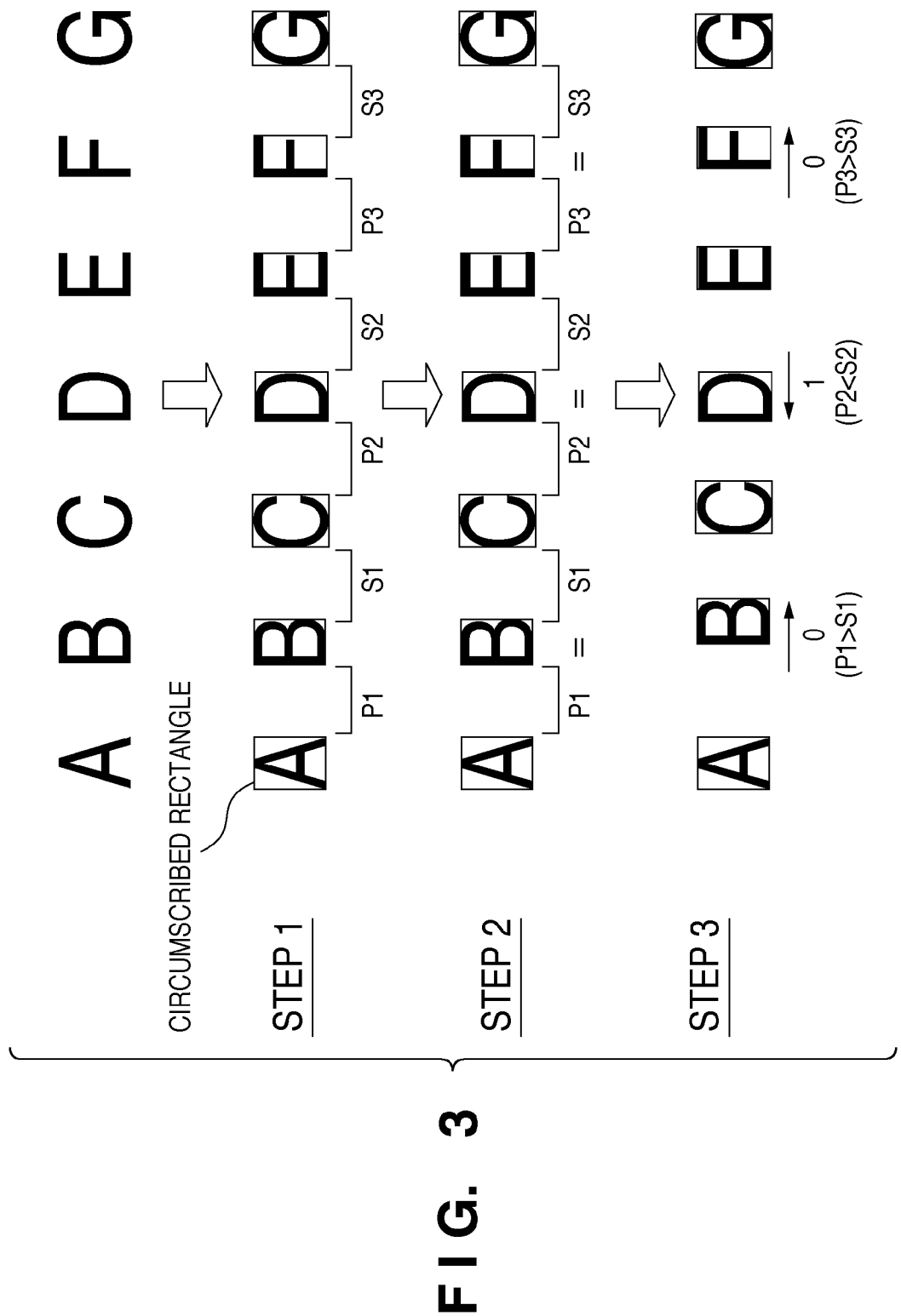
FIG. 3 is a diagram illustrating an example of a document that has character-spacing watermark information embedded therein.

The present embodiment has the feature that it enables high-speed determination of whether or not a document image has character-spacing watermark information embedded therein by the use of character spacing. FIG. 3 illustrates an example of character-spacing watermark information that has been embedded and that is a target of determination according to the present embodiment. In the example of FIG. 3, one-bit information has been embedded in a character string of "ABCDEFG" by the use of spacing values between two characters.

First, in step S1, a rectangle circumscribing each character and distances between such circumscribed rectangles, that is, character spacing values P and S, are extracted using a common character recognition technique such as a technique of extracting a rectangle circumscribing a character. Then, in step S2, the pair of character spacing values P and S is normalized so that they have the same value. Thereafter, in step S3, characters are moved so as to control the spaces there between; the character spacing is controlled so that P>S when the "0"s of binary information are to be embedded or so that P<S when the "1"s are to be embedded.

More specifically, for example, a character motion amount X is defined in advance and character spacing is controlled so that P=P+X and S=S−X when P>S and P=P−X and S=S+X when P<S. In the present embodiment, accordingly, the presence or absence of a character-spacing watermark, as illustrated in FIG. 3, in a document to be processed can be determined at high speed.

Figure 1A:
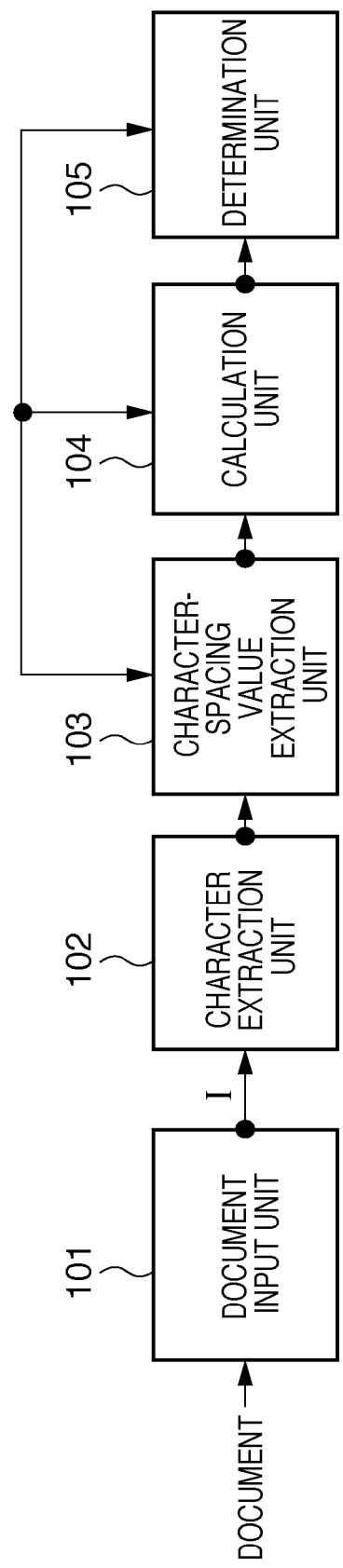
FIG. 1 is a block diagram illustrating a fundamental functional configuration of a document processing apparatus according to a first embodiment.

FIG. 1 is a block diagram illustrating a fundamental functional configuration of a document processing apparatus according to the present embodiment. As illustrated in FIG. 1, the document processing apparatus according to the present embodiment includes a document input unit 101, a character extraction unit 102, a character-spacing value extraction unit 103, a calculation unit 104, and a determination unit 105. The document input unit 101 inputs a document image that is not limited to an image printed on recording paper or an electronic image (such as a PDF file). The character extraction unit 102 extracts only character portions from the input document image. The character-spacing value extraction unit 103 extracts a character spacing value between characters. The calculation unit 104 calculates fluctuations in the extracted character spacing values. The determination unit 105 determines the presence or absence of watermark information based on the calculation result.

Figure 2:
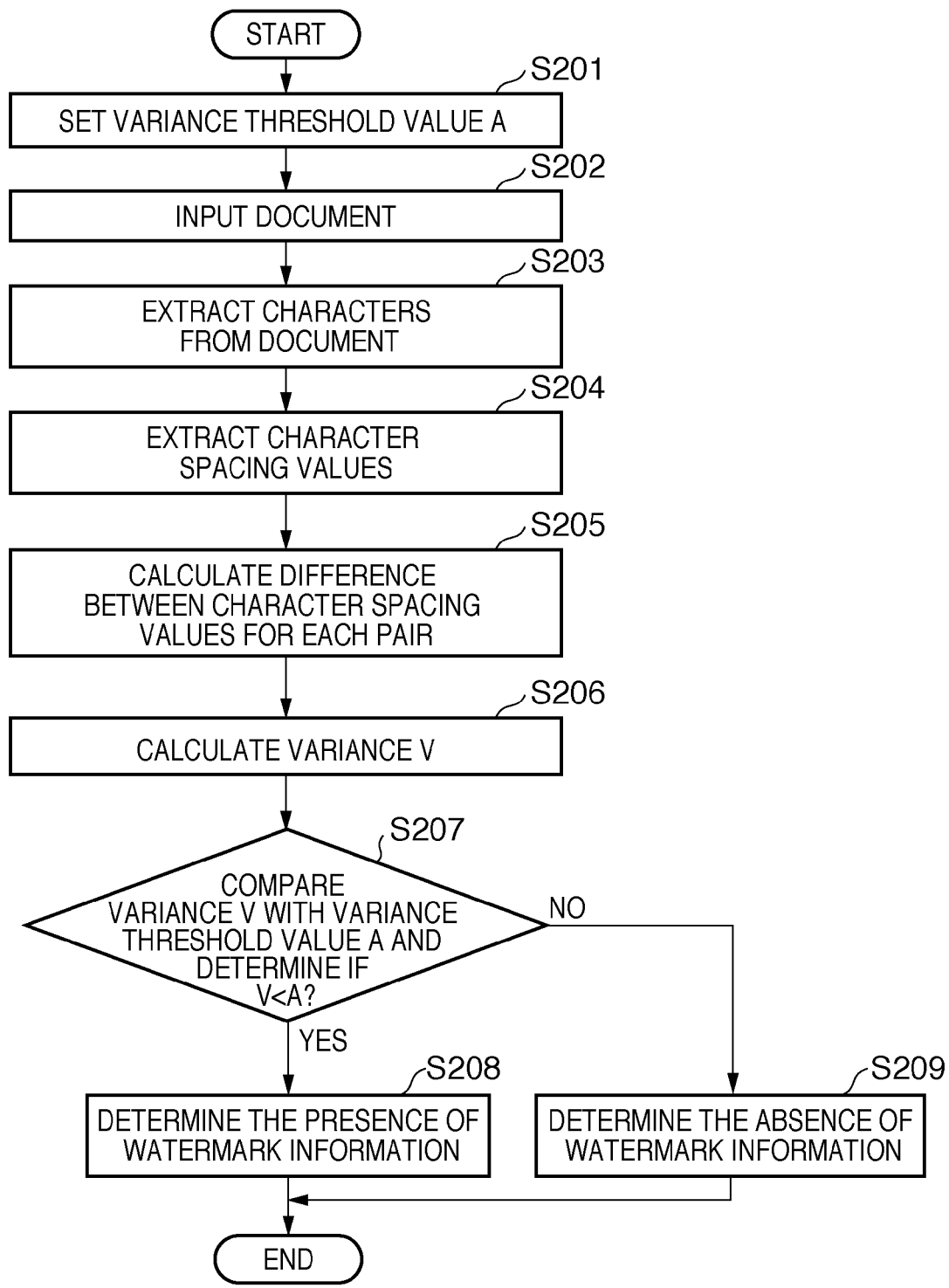
FIG. 2 is a flow chart illustrating a process for determining the presence or absence of character-spacing watermark information according to the first embodiment.

The following describes the process for determining the presence or absence of character-spacing watermark information according to the present embodiment with reference to the flow chart in FIG. 2.

First, in step S201, the determination unit 105 sets a variance threshold value A that is used to determine whether or not a document image includes watermark information. This variance threshold value A may be held in the determination unit 105; in the present example, the variance threshold value A shall be 1.0.

Then, in step S202, the document input unit 101 inputs a document image as a document and transmits the input document image as document data I to the character extraction unit 102. Note that, in the case where the document image is a paper document, the document input unit 101 inputs the document image using a reading unit such as a charge coupled device (CCD) or an optical sensor. The document input unit 101 generates document data I through processing performed by the reading unit, such as document image capture, electric signal processing, or digital signal processing, according to an image input instruction. In the case where the document data I is processed in a data format such as PDF in the document processing apparatus, the document input unit 101 processes the document data I in that data format.

Then, in step S203, the character extraction unit 102 extracts character portions from the document data I. Thereafter, in step S204, the character-spacing value extraction unit 103 sequentially extracts character spacing values for the extracted characters. At this time, it is not necessary to extract all characters and all character spacing values in the document data I; for enhanced speed, a predetermined number of characters and a corresponding number of character spacing values may be set to be extracted in advance.

Note that, since the character-spacing watermark information to be extracted according to the present embodiment has been embedded according to the sizes of two character spaces, it is necessary to acquire a total of N pairs of character spacing values, each pair consisting of two character spacing values, that is, to acquire 2N character spacing values. In other words, the number of character spacing values to be acquired is a multiple of two, and two is the minimum number of character spacing values. To simplify the description, the following describes the case of extracting twelve character spacing values in a certain single line.

The "character spacing value" as used in the present embodiment may be defined as a blank portion between characters or may be a sum of the width of a single character and the width of a blank portion; it may be defined as appropriate in view of the processing to be performed in the apparatus.

After the character spacing values have been extracted as described above in step S204, then in steps S205 and S206, the calculation unit 104 calculates fluctuations in the character spacing values. To be more specific, the calculation unit 104 calculates a difference between two character spacing values for each pair of character spacing values in step S205. The calculation unit 104 then calculates fluctuations in those differences in step S206.

Now, a specific example of the calculation of fluctuations according to the present embodiment will be described. In the present embodiment, a variance is used for the calculation of fluctuations; the following describes an example of the calculation of a variance depending on the presence or absence of a character-spacing watermark.

FIG. 4 illustrates an example of the calculation of a variance in a document image that has a character-spacing watermark embedded therein. Assuming that the character spacing values of 17, 10, 12, 20, and so on are extracted in this order, the differences between the respective pairs of character spacing values (absolute values) are calculated as 7, 8, 8, 8, and so on, respectively, in this order. In the example illustrated in FIG. 4, the character motion amount X described above shall be set to 4; since the difference between each pair of character strings P and S is 2X, their average is theoretically eight; however, an average Ave for the difference is calculated at 7.67 in consideration of influences such as enlargement of characters due to copying. Using this average Ave, an average of the squares of deviations for the differences is calculated; as a result, a variance V of 0.22 is obtained.

Here, if the average Ave of differences is calculated from first multiple differences, it is possible to speed up the calculation of the variance V. For example, the average Ave is calculated using the first three values of "differences," 7, 8, and 8, in FIG. 4, and this average Ave is used for the later calculation of deviations; accordingly, the calculation of a deviation can be started without waiting for all the values of differences to be extracted. This increases the efficiency of sequential processing using character spacing values and accordingly increases the processing speed.

Meanwhile, there is also the case where an ordinary original, which does not include watermark information (in which character spacing is not manipulated), is input by the document input unit 101. FIG. 5 illustrates an example of the result of a variance calculated for such a document image that has no character-spacing watermark embedded therein. Assuming that character spacing values of 13, 14, 15, 17, and so on are extracted in this order, the differences between the respective pairs of character spacing values (absolute values) are calculated at 1, 2, 4, and so on in this order. In this case, the average Ave of the differences is calculated at 3.0. Using this average Ave, an average of the squares of deviations for the differences is calculated; as a result, a variance V of 6.0 is obtained.

As described above, in general, a variance in the differences between the respective pairs of character spacing values varies depending on the presence or absence of a character-spacing watermark. Specifically, the variance tends to be relatively low in the presence of a character-spacing watermark, whereas the variance tends to be relatively high in the absence of a character-spacing watermark.

In view of this, in step S207, the determination unit 105 compares the variance V calculated in step S206 with the variance threshold value A (A=1.0) set in step S201. If V<A (YES in step S207), it is determined in the step S208 that "watermark information is present." If V<A is not satisfied, on the other hand, it is determined in step S209 that "watermark information is absent."

Note that, in the case of a document that has been copied repeatedly, there is a possibility that characters themselves may become enlarged, that is, character spacing values may be narrowed; this can be taken into consideration at the time of setting the variance threshold value in step S201.

In order to further increase the precision of determination, it is also effective to provide a threshold value for the average Ave of differences. Specifically, not only the variance threshold value A but also a threshold value B for the average Ave are set in step S201. Then, for example in the case where the character motion amount X is set to 4, the threshold value B is set in the range of 6 to 10 so that the average Ave of 2X=8 has a margin in consideration of enlargement of characters due to copying. Then, in step S207, two conditions are considered: the first condition that the average Ave is within the range of the average threshold value B (6<Ave<10); and the second condition that the variance V is lower than the variance threshold value A (V<A). That is, when both the first and second conditions are satisfied, it may be determined in step S208 that "watermark information is present."

Note that a measure to further improve performance in determining the presence or absence of a character-spacing watermark described in the present embodiment will be described with reference to FIG. 6A. Referring to a document image 601 illustrated in FIG. 6A, it is effective to provide multiple blocks from which character spacing values are acquired, as illustrated in the arrows A, B, and C in the main scanning direction. In one conceivable example of the method at that time for determining the presence or absence of a character-spacing watermark, when the variance(s) obtained from at least one or all of the arrows A, B, and C is or are lower than the variance threshold value A, it may be determined that "watermark information is present."

While the present embodiment has explicitly described the three areas indicated by the arrows A, B, and C in order to simplify the description, as a matter of fact, there are also other arrows in the sub-scanning direction in addition to the arrows A, B, and C. The content of the description given herein thus also includes such cases where four or more arrows are periodically or discretely scattered in the sub-scanning direction. The number of such arrows to be scattered may vary as appropriate according to the document size (such as A4 or A3).

It is assumed to adopt a mode (referred to as a "first mode") in which when the variance obtained from at least one of the arrows A, B, C, and so on is lower than the variance threshold value A, it is determined that "watermark information is present." In this case, if a block (character string) that is likely to have watermark information embedded therein can be detected from even one part of a document image, it can be determined that "watermark information is present." In other words, this determination can be said to be highly responsive to the existence of watermark information.

On the contrary, it is assumed to adopt a mode (hereinafter referred to as a second mode) in which only when the variances obtained from all the arrows arrow A, B, C, and so on are lower than the variance threshold value A, it is determined that "watermark information is present." In this case, it can be determined that "watermark information is present" only when the whole document image has watermark information embedded therein. Accordingly, this determination can be said to be poorly responsive to the existence of watermark information. However, this has the effect of preventing a document from been determined as including watermark information by mistake and thus suppressing the occurrence of needless processing being performed in the later steps.

In the present embodiment, a user can set or switch the above-described first and second modes as necessary by inputting or issuing an instruction from a predetermined input or instruction unit.

Alternatively, as a further improvement in the above-described determination method using the first and second modes, it is also effective to use the following determination method (third mode). In the present embodiment, the third mode may be used instead of the first and second modes or in parallel thereto. In the third mode, when the ratio of variances that are lower than the variance threshold value A, from among the variances obtained from the arrows A, B, C, and so on, is a predetermined ratio or more, it is determined that "watermark information is present."

As a specific example, consider the case where twenty arrows (A, B, C, . . . ) are scattered in the sub-scanning direction and, from among the variances obtained from the twenty scattered arrows, there are ten variances that are lower than the variance threshold value A. In this case, the ratio of the areas (arrows) for which it has been determined that "watermark information is present" is 50%, so it is determined that it exceeds a predetermined ratio (40%, in the present example). Attention should be given to the point that, in this third mode, a user can change the above ratio (40% in the present example) that functions as the threshold value. Thus, if this ratio is set to 0.01%, the same determination as in the first mode can be performed. If this ratio is set to 99.9%, the same determination as in the second mode can also be performed. This ratio serving as a criterion in the third mode can be set by a user inputting or issuing an instruction from the above-described input or instruction unit.

Although the above description has given the example where multiple determination areas (arrows A, B, C, . . . ) are provided in the sub-scanning direction, it can be for higher-precision determination to also provide such determination areas (arrows) discretely in the main scanning direction. Specifically, on the same line as the determination area indicated by the arrow A, an arrow A' is provided at a position spaced somewhat from the arrow A. Similarly, on the same line as the determination area indicated by the arrow B, an arrow B' is spaced somewhat from the arrow B. Similarly, an arrow C' is provided. For the other arrows Z (Z is a variable) not shown, arrows Z' are similarly provided.

Then, for each of all those arrows, it is determined whether "watermark information is present" or "watermark information is absent" as described above. The determination result for each arrow is used for the determination of whether "watermark information is present" or "watermark information is absent" for the entire document image, based on the above-described determination technique in the third mode. In this way, determining the presence or absence of watermark information in the two-dimensional direction, namely the main scanning direction and the sub-scanning direction, can further increase the precision of the determination.

Figure 6B:
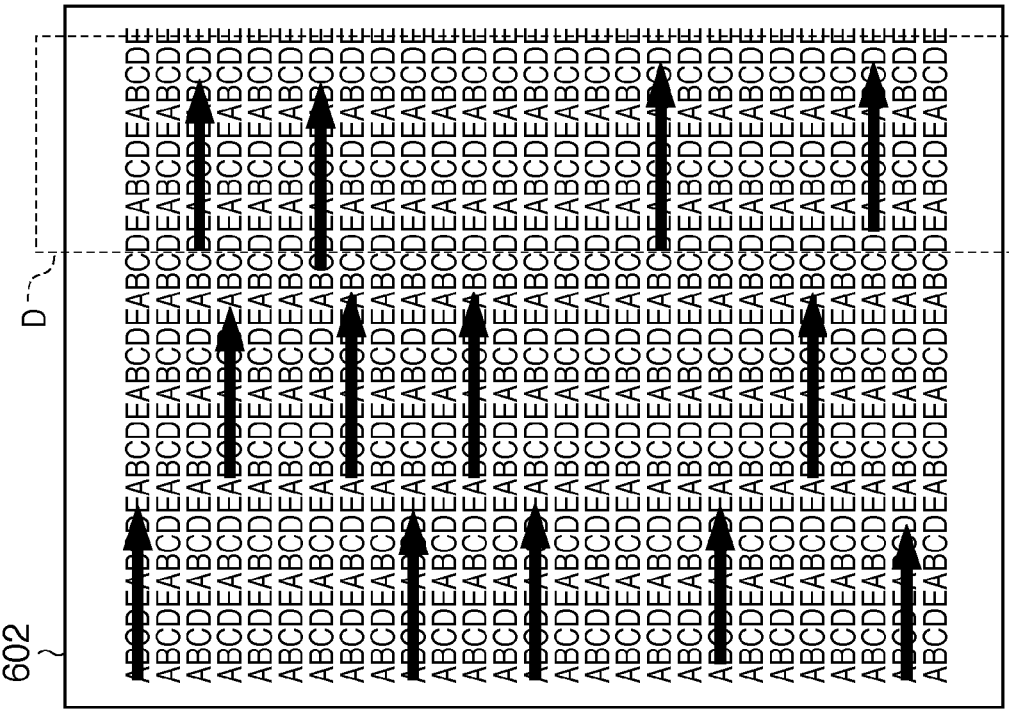
FIGS. 6A and 6B are diagrams illustrating examples in which the positions from which character spacing values are acquired in a document are controlled according to the first embodiment.
Figure 6A:
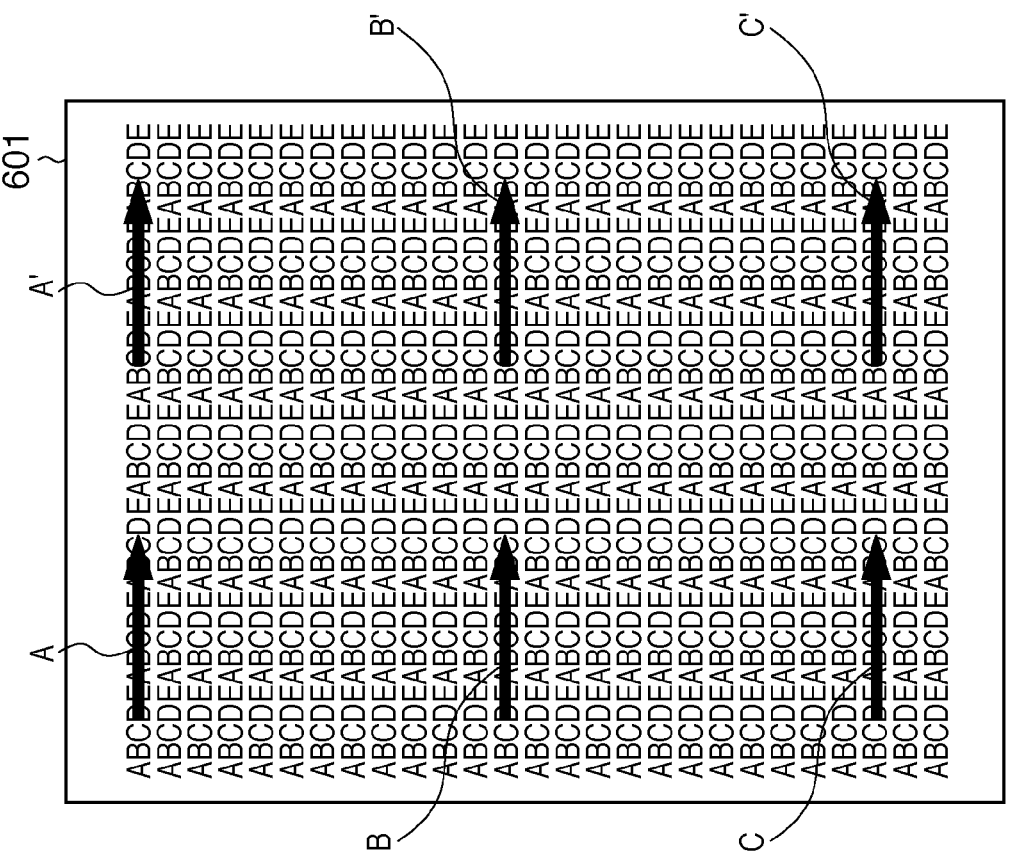

Moreover, a method for acquiring character spacing values from random areas as illustrated by the arrows in FIG. 6B is also effective in supporting the case of a document image whose structure is unpredictable at a user level. In this case, it requires caution to acquire character spacing values from those arrows that are within a region D in a document image 602 (in other words, an area that is equivalent to the tail end of each line). In the character-spacing watermark determination method described as a conventional technique in FIG. 3, if a single line includes an even number of characters, it is necessary to exclude a spacing value between the last character and the second to last character from the calculation of a variance (because these two characters were not moved at the time of embedding).

To this end, the number of characters in each line is previously counted from the line start (the left end in FIGS. 6A and 6B) and, if the result of such counting is an even number, a process for excluding the last character spacing value from the calculation is performed. This has the advantage of increasing the precision of the calculation of a variance. Alternatively, in the case where processing is performed from the line end (the right end in FIGS. 6A and 6B) to the line start, the following determination is performed. Specifically, two determination results are obtained: "a first determination result obtained by calculating a variance using pairs that are paired starting from the first character spacing value from the line end"; and "a second determination result obtained by calculating a variance using pairs that are paired starting from the second to last character spacing value from the line end." Then, if either of these first and second determination results show that "watermark information is present," ultimately it may be determined that "watermark information is present." This determination method has the advantage of enabling high-speed determination of the presence or absence of watermark information since it is unnecessary to count the number of character spacing values in a whole single line.

As described above, according to the first embodiment, the presence or absence of character-spacing watermark information is determined based on fluctuations in character spaces in a document image. This enables high-speed and high-precision determination of the presence or absence of character-spacing watermark information, as compared with the case where a data string of values that have been actually embedded in a document image is extracted and verified.

Accordingly, a system that switches processing to be performed on an input document depending on the presence or absence of a character-spacing watermark can perform appropriate processing at high speed, so that the processing efficiency of the entire system is improved. For example, in the case where a copying machine controls copy permission based on a character-spacing watermark, no delay occurs in the copy operation.

Second Embodiment

The following describes a second embodiment according to the present invention. The second embodiment is implemented as a variation of the aforementioned first embodiment. Specifically, the first embodiment has described an example where a document image that has a character-spacing watermark embedded therein is processed by moving every other character so as to control character spacing. In the second embodiment, a target to be processed is a document image in which characters such as "punctuation marks" are intentionally prohibited from being subjected to character spacing control.

Figure 7:
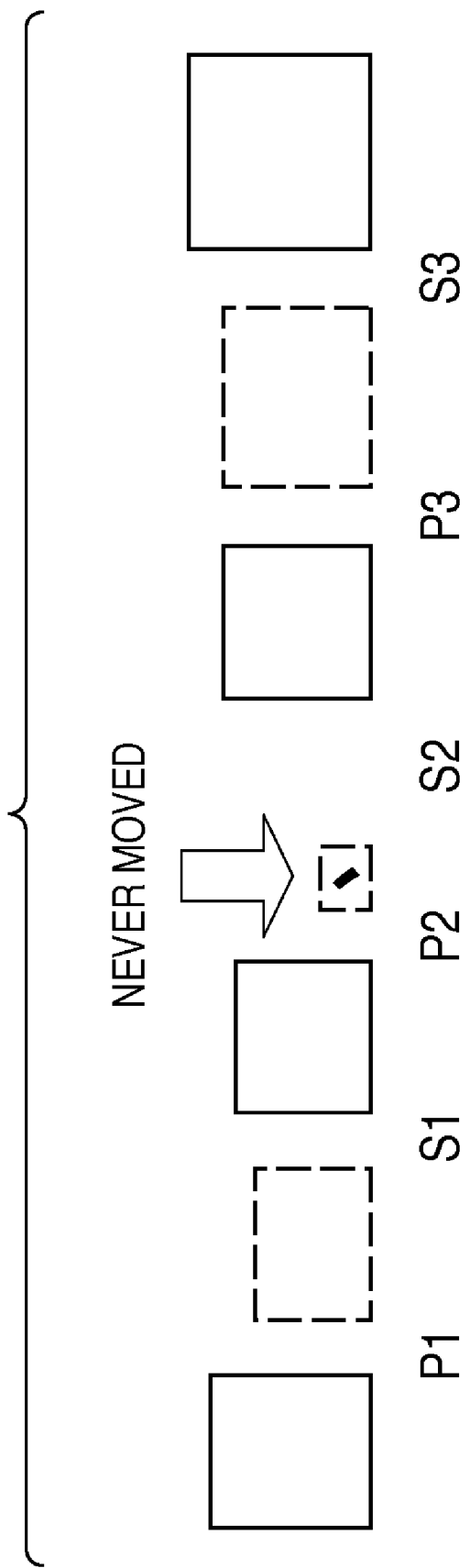
FIG. 7 is a diagram illustrating an example in which character spacing control is not performed in the case of a "punctuation mark" according to a second embodiment.

For example, when a character to be moved is a punctuation mark or the like as illustrated in FIG. 7, moving the character may, in some cases, cause a shift of the punctuation mark to the right, too close to its right-lateral circumscribed rectangle, thus giving a feeling of imbalance in the document. In such a case, avoiding moving such a punctuation mark will rather result in the quality of a document being maintained. In the case where a target to be processed is such a document image in which characters such as "punctuation marks" have not been moved, if the first embodiment is used to extract character-spacing watermark information, the following problem may occur. Specifically, the presence or absence of a character-spacing watermark may be determined in error because the variance is calculated using the character spacing values (P2 and S2 in FIG. 7) in front of and after such a character that has not been moved. In view of this, the second embodiment has the feature that, at the time of extracting character-spacing watermark information, detection is performed in consideration of the fact that characters such as "punctuation marks" have not been moved, so that extracting character-spacing watermark information from that area is prohibited.

The following describes the process for determining the presence or absence of a character-spacing watermark according to the second embodiment and, in particular, mainly describes the dissimilarities from the aforementioned first embodiment. Note that a document processing apparatus according to the second embodiment has the same configuration as in FIG. 1A described in the first embodiment, so a description thereof will be omitted.

Figure 8:
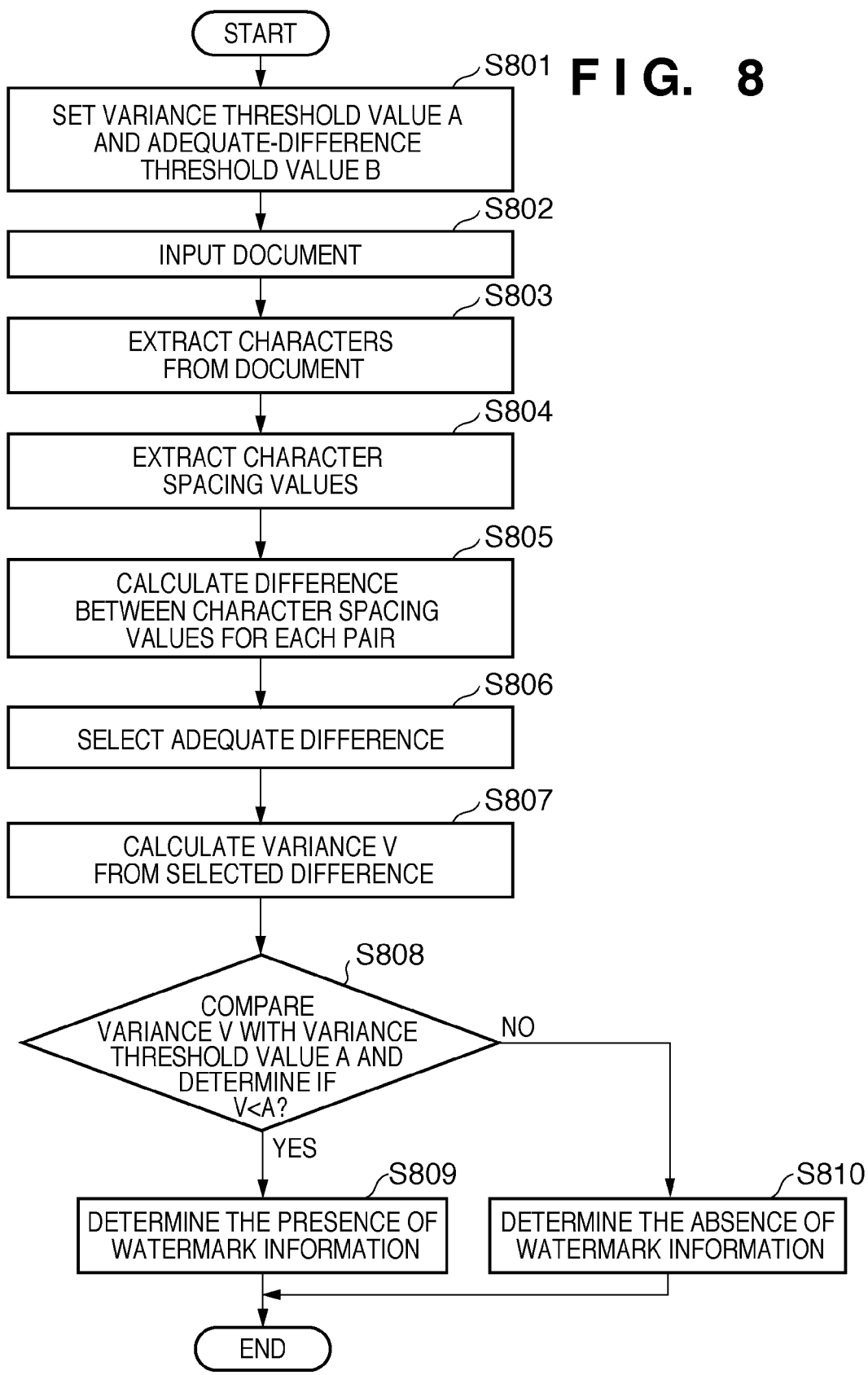
FIG. 8 is a flow chart illustrating a process for determining the presence or absence of character-spacing watermark information according to the second embodiment.

FIG. 8 is a flow chart illustrating the process for determining the presence or absence of character-spacing watermark information according to the second embodiment.

First, in step S801, the determination unit 105 sets a variance threshold value A that is used to determine whether or not a document image includes watermark information, and an adequate-difference threshold value B that is used to select an adequate difference between character spacing values. The variance threshold value A and the adequate-difference threshold value B may be held in the determination unit 105 as in the first embodiment; in the present example, it is assumed that A=1.0 and B=20.

Then, in steps S802 to S805, character portions are extracted from the input document as in steps S202 to S205 of the first embodiment, character spacing values are acquired, and then a difference between each pair of character strings values is calculated.

Figures 9, 10:
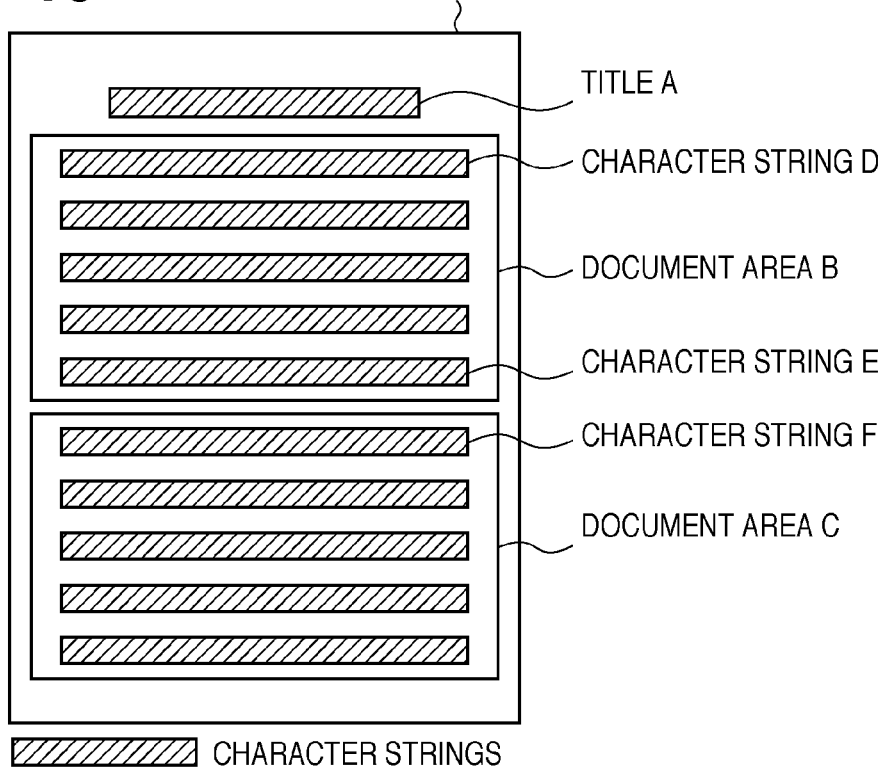
FIG. 9 is a diagram illustrating an example of the calculation of fluctuations in a watermarked document according to the second embodiment.
FIG. 10 is a diagram illustrating an example of a watermarked document to be processed according to a third embodiment.

In the present example, as illustrated in FIG. 9, twelve character spacing values that include a punctuation mark shall be extracted from a certain single line. Specifically, assuming that character spacing values of 17, 10, 12, 20, . . . , 10, and 60 are extracted in this order, differences (absolute values) between the respective pairs of character spacing values are calculated at 7.0, 8.0, . . . , 7.0, and 50.0 in this order. In this case, the last two character spacing values 10 and 60 correspond to a punctuation mark and their difference is 50.0.

After the difference for each pair has been calculated in step S805 as described above, then in steps S806 and S807, fluctuations in the differences are calculated. Specifically, first in step S806, each difference is compared with the adequate-difference threshold value B of 20 set in step S801 so as to select an adequate difference. More specifically, for example, from among the differences illustrated in FIG. 9, any difference that is higher than the adequate-difference threshold value B of 20 is excluded; that is, the value of 50.0 is excluded from the targets of the calculation of fluctuations. Then in step S807, the remaining differences (enclosed in the black box in FIG. 9) are used to calculate a variance V as in the first embodiment. In the example illustrated in FIG. 9, an average Ave is calculated from the differences that exclude the value of 50.0; as a result, a variance of 0.24 is obtained.

Then, in step S808, the determination unit 105 compares the variance V of 0.24 calculated in step S807 with the variance threshold value A of 1.0 set in step S201. In this case, since V<A, it is determined in the step S809 that "watermark information is present." If V<A is not satisfied, on the other hand, it is determined in step S810 that "watermark information is absent" and the process is ended.

Note that, although the second embodiment has described an example where any inadequate difference is excluded and only the remaining differences are used to calculate the variance, the present invention is not limited thereto; for example, the same number of character spaces as those that have been excluded may be added for the calculations of the average and the variance.

As an alternative method for determining a difference to be excluded, instead of determining a target to be excluded based on the value of a difference as described in the second embodiment, a target to be excluded may be determined based on the character spacing values or the variances.

While the second embodiment has described a measure for the case where the difference between character spaces increases in the case of "punctuation marks," other conceivable problems include the case where the difference between character spaces decreases, such as the case of commas, or the case where an inadequate character spacing value may be acquired due to factors such as noise or addendum information in a document. One conceivable measure for such cases is selecting and using intermediate differences from among multiple differences, at the time of discriminating adequate differences in step S806. For example, in the case where the differences obtained from six character spacing values are 7, 8, 8, 7, 2, and 50, the maximum value of 50 and the minimum value of 2 may be excluded and the remaining four values (7, 8, 8, and 7) may be used for the calculation of the variance. This enables the calculation of a more appropriate variance, thus improving reliability in determining the presence or absence of watermark information. Note that the case of using intermediate values has been described herein, a criterion for excluding an inadequate difference may be set according to the usage; for example, only the minimum value or the maximum value may be excluded.

As described above, the second embodiment enables high-speed and high-precision determination of the presence or absence of watermark information even in a document image in which character spacing control for characters such as "punctuation marks" is prohibited in order to maintain quality.

Note that, although the first and second embodiments have described the examples where the calculation unit 104 calculates a variance and the determination unit 105 compares the variance with the threshold value, any value such as a deviation or a standard deviation that represents fluctuations in input values may be used instead of a variance.

Moreover, the first and second embodiments have described the case where a target to be processed is a document image that has watermark information embedded therein according to the sizes of a single pair of character spaces as illustrated in FIG. 3. However, a character-spacing watermark in a document image to be processed according to the present invention may be embedded by any other method. For example, the present invention is applicable to any other method for embedding watermark information by manipulating character spaces, such as defining an initial character space as a reference character space and then embedding information sequentially based on the differences of other character spaces from the reference character space.

While the first and second embodiments have described the examples where a document image having horizontal line orientations is subjected to the determination of the presence or absence of a character-spacing watermark, it is apparent that those embodiments may be applied in the case of a document having vertical line orientations.

Third Embodiment

The following describes a third embodiment according to the present invention. The third embodiment describes an example in which the process for determining the presence or absence of watermark information described in the above first and second embodiments is used at the time of actual watermark information extraction.

Figure 11B:
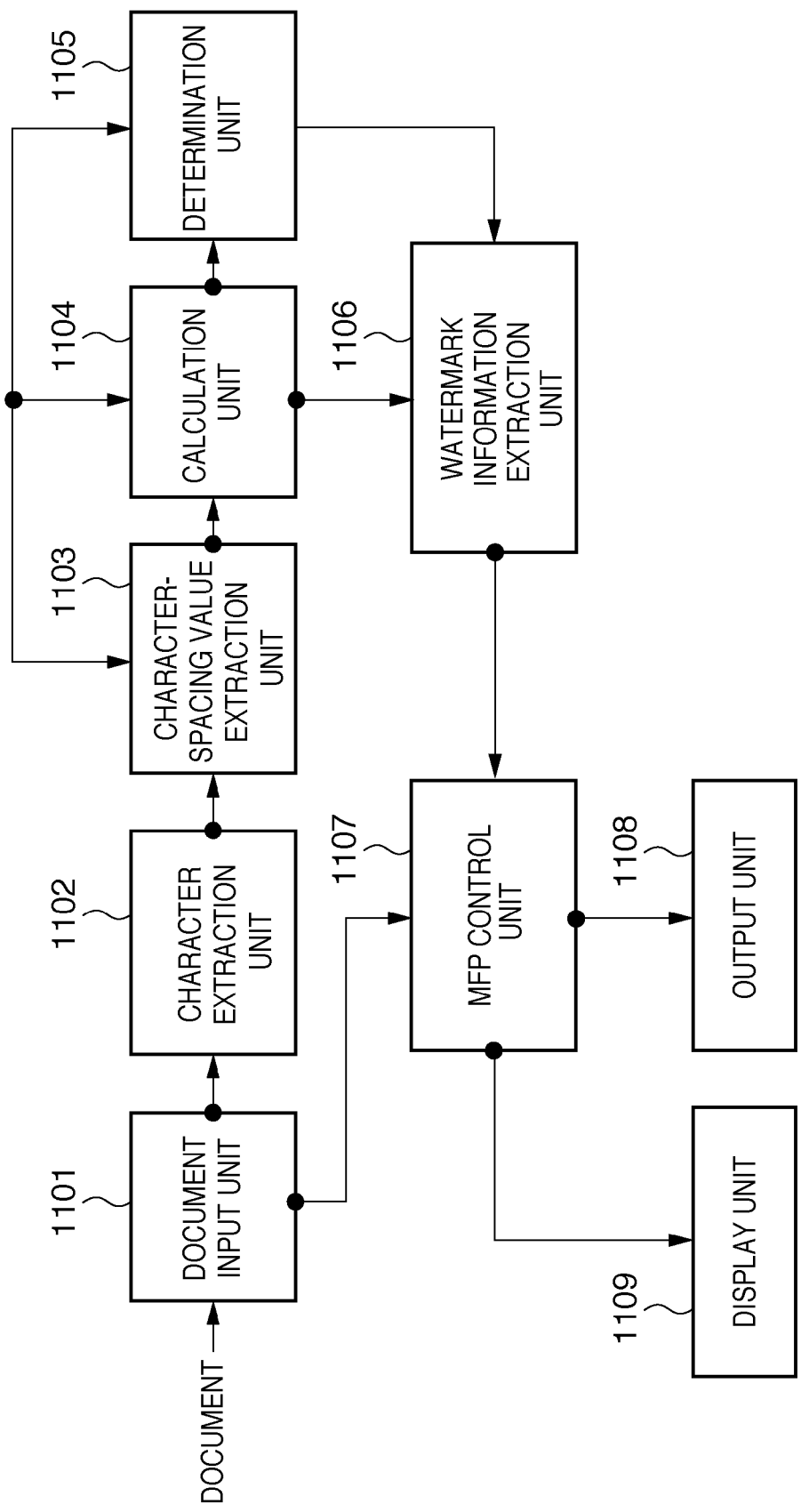

FIG. 11A is a block diagram illustrating a fundamental functional configuration of a document processing apparatus according to the third embodiment; the same components as described in the above first embodiment are denoted by the same reference numerals and the descriptions thereof will be omitted. The configurations illustrated in FIGS. 11A and 11B have the feature that they include a watermark information extraction unit 106 that extracts watermark information according to an instruction from the determination unit 105.

Figure 12:
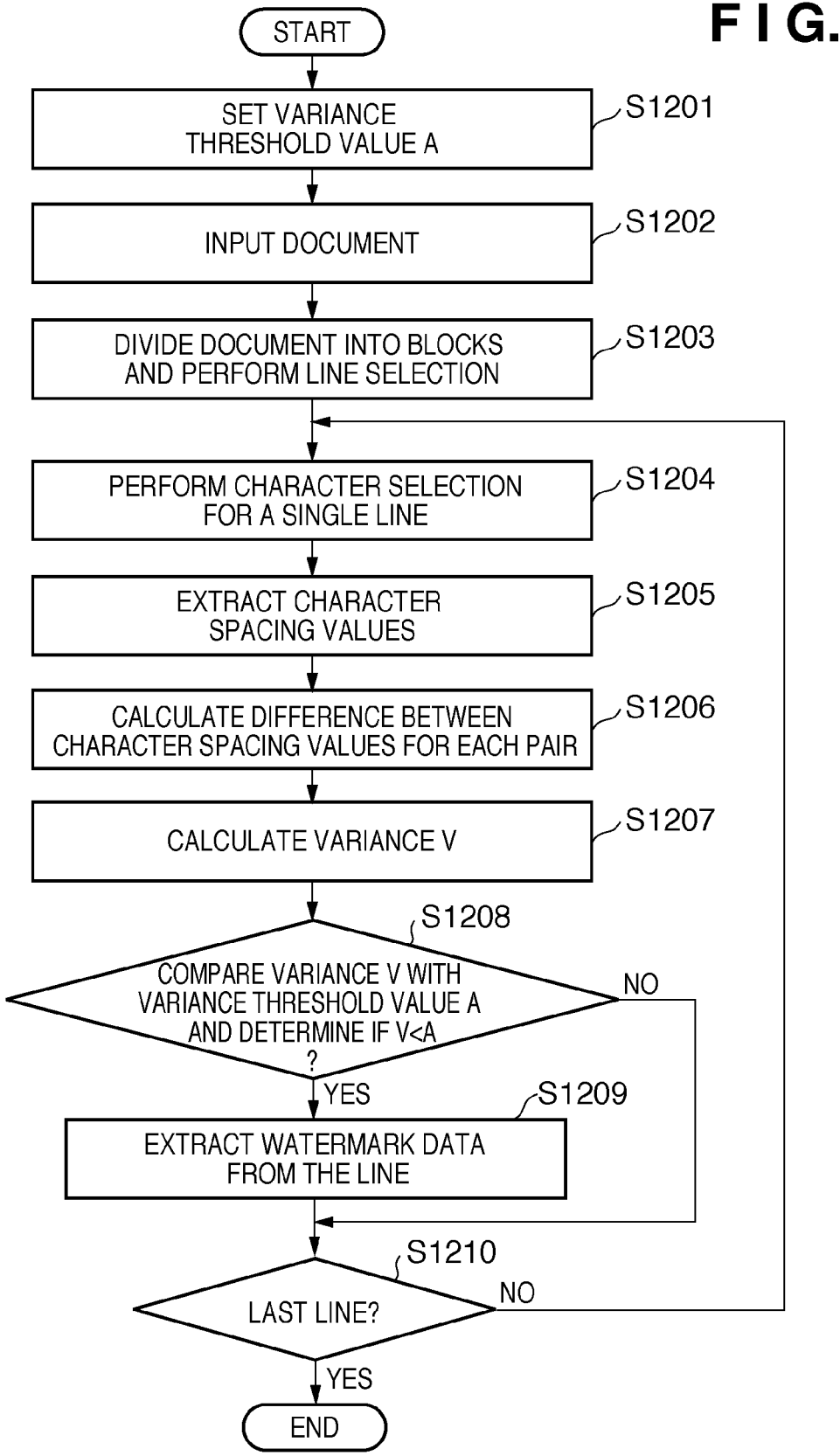
FIG. 12 is a flow chart illustrating a process for extracting character-spacing watermark information according to the third embodiment.

FIG. 12 is a flow chart illustrating the process for extracting character-spacing watermark information according to the third embodiment.

Assuming herein that a document image 1001 in a format illustrated in FIG. 10 has been input, an example of extracting watermark information from the document image 1001 will be described. The document image 1001 has character-spacing watermark information embedded in only a document area B that ranges from a character string D to a character string E and has no watermark information embedded in the remaining character strings that include a title A and a document area C.

First, in step S1201, the determination unit 1105 determines a variance threshold value A that is used to determine whether or not a document image includes watermark information as in the first embodiment. This variance threshold value A may be held in the determination unit 1105; in the present example, it is assumed that A=1.0.

Then, in step S1202, the document input unit 1101 inputs the document image 1001 illustrated in FIG. 10 as a document and transmits the document image 1001 as document data I to the character extraction unit 1102.

Then, in step S1203, the character extraction unit 102 divides the document data I into blocks using a character recognition technique, and character strings are selected from the areas obtained by the block division, which is referred to as "line selection." For example, in the case of the document image 1001 illustrated in FIG. 10, the title A and the document areas B and C are extracted by the block division, and then a character string that is equivalent to the title A, the character strings D to E in the document area B, and character strings after a character string F in the document area C are extracted.

Then, in step S1204, the character extraction unit 1102 first extracts a rectangle circumscribing each character for the initial single line (the title A in FIG. 10) (character selection). At this time, it is not necessary to extract all characters and all character spacing values in a line; for enhanced speed, a predetermined number of characters and a corresponding number of character spacing values may be set to be extracted in advance. Then, in step S1205, the character-spacing value extraction unit 1103 sequentially extracts character spacing values for the extracted characters.

After the character spacing values have been extracted as described above in step S1205, then in steps S1206 and step S1207, the calculation unit 1104 calculates fluctuations in the character spacing values. To be more specific, the calculation unit 1104 calculates a difference between each pair of character spacing values in step S1206. The calculation unit 1104 then calculates a variance V in the differences in step S1207.

Then, in step S1208, the determination unit 1105 compares the variance V with the variance threshold value A. In this case, since the title A illustrated in FIG. 10 includes no watermark information, the variance V is higher than the variance threshold value A and the process goes to step S1210. In step S1210, the determination unit 1105 determines whether or not the current line being processed is the last line; in the present example, the line is not the last line, so the process returns to step S1204.

In step S1204, a rectangle circumscribing each character is extracted from the next single line to the title A, that is, the character string D, in FIG. 10.

In the case of FIG. 10, the document area B that includes the character string D includes watermark information. Thus, the variance V calculated in the processing from steps S1205 to S1207 is lower than the variance threshold value A in step S1208. In this case, the process goes to step S1209 in which the watermark information extraction unit 106 extracts watermark information from the character string D according to an instruction from the determination unit 105. Thereafter, the process goes to step S1210 and the processing from step S1204 is repeatedly performed until the processing for the last line is completed.

In this way, according to the third embodiment, the presence or absence of watermark information is determined one by one for each line until the last line, and watermark information is extracted from only those lines that have been determined as including watermark information. For example, in the example illustrated in FIG. 10, the extraction of information from only the character strings in the document area B that includes watermark information is attempted, and information is not extracted from the title A and the document area C that include no watermark information (extraction is prohibited).

Note that, although the third embodiment has described an example where the presence or absence of watermark information is determined one by one for each line, the present invention is not limited thereto; alternatively, the determination may be performed only on the first line in each document area, which further speeds up processing in its entirety. For example, in the case of the document image 1001 illustrated in FIG. 10, as a first step, the first character string D in the document area B is subjected to determination and, if the result of the determination is that "watermark information is present," watermark information is extracted from the entire document area B by one operation. Next, the first character string F in the document area C is subjected to determination and, if the result of the determination is that "watermark information is absent," the process is ended at that point.

As described above, the third embodiment enables high-speed specification of an area that includes watermark information and accordingly enables highly efficient information extraction even in the case where a single document includes both an area that includes watermark information and an area that does not include watermark information.

Fourth Embodiment

The present embodiment describes control by a multifunctional peripheral (MFP) that incorporates therein the document processing apparatus according to the first to third embodiments. Note that operations that will not be described in the present embodiment are performed as described in the aforementioned first to third embodiments.

FIG. 11B is a block diagram illustrating a fundamental functional configuration of a document processing apparatus according to the present embodiment. In addition to the functional configuration in FIG. 11A, the configuration in FIG. 11B further includes an MFP control unit 1107, an output unit 1108 such as a printer, and a display unit 1109.

One example of the usage of such an MFP is a security function to prevent unauthorized copying. This is a function to prevent unconditional copying by embedding watermark information in a confidential document or the like.

As a first step, a user initiates copying of a document using an MFP. Specifically, a user places a document on the document input unit 1101 serving as a scanner and issues a copy instruction with the display unit 1109.

The subsequent processing determines, as described in the first and second embodiments, the presence or absence of watermark information (the flow chart in FIG. 2). Here, a detailed description will be omitted, and the processing performed by the determination unit 1105 after the presence or absence of watermark information has been determined will be described.

First, when the determination unit 1105 has determined that "watermark information is present," the watermark information extraction unit 1106 extracts watermark information from the entire document image and provides notification about the extracted watermark information to the MFP control unit 1107. When having determined from the watermark information that the document is a confidential document, the MFP control unit 1107 forcefully terminates copy processing. Then, the MFP control unit 1107 causes the display unit 1109 to display a notification such as "copy-restricted document". As another method, at the time when the determination unit 1105 has determined that "watermark information is present," the MFP control unit 1107 may determine that the document is a confidential document.

On the other hand, when the determination unit 1105 has determined that "watermark information is absent," the watermark information extraction unit 1106 provides a notification about that result to the MFP control unit 1107. Thereafter, from the determination result that "watermark information is absent," the MFP control unit 1107 determines that the document is not a confidential document and causes the output unit 1108 to output the document image as-is that has been read by the document input unit 1101. That is, copy processing is performed. The display unit 1109 displays a notification such as "copy completed."

Another usage of the MFP is tracking the leaking of information from a confidential document. Specifically, a document image of a confidential document or the like is printed that has embedded therein watermark information for tracking an information leak (for identifying the printing source) such as the date and time of printing, a person who printed the document, a person to whom information has been distributed, and the ID number of an MFP. In the case where such a confidential document has been leaked to a person outside an organization, if the document can be acquired thereafter, the determination of "the presence or absence of watermark information" according to the present invention is performed using the MFP, and if the result of the determination showed that "watermark information is present," the source of the leak can be tracked (identified) by extracting and analyzing the watermark information from the entire document. If it is possible to manage by ID numbers a series of pieces of information for use in tracking the source of a leak such as a person who printed the document, an alternative method may be embedding only such ID numbers as watermark information.

As described above, according to the fourth embodiment, by using the configurations described in the first to third embodiments, it is possible to speedily achieve the function of preventing unauthorized copying or the function of tracking an information leak. Specifically, it is possible to notify the display unit about the contents of control performed in outputting a document image, based on the result of the determination of the presence or absence of watermark information.

Fifth Embodiment

The following describes a fifth embodiment according to the present invention. The fifth embodiment has the feature that it causes a computer system to perform the processing described above in the first to fourth embodiments.

Figure 13:
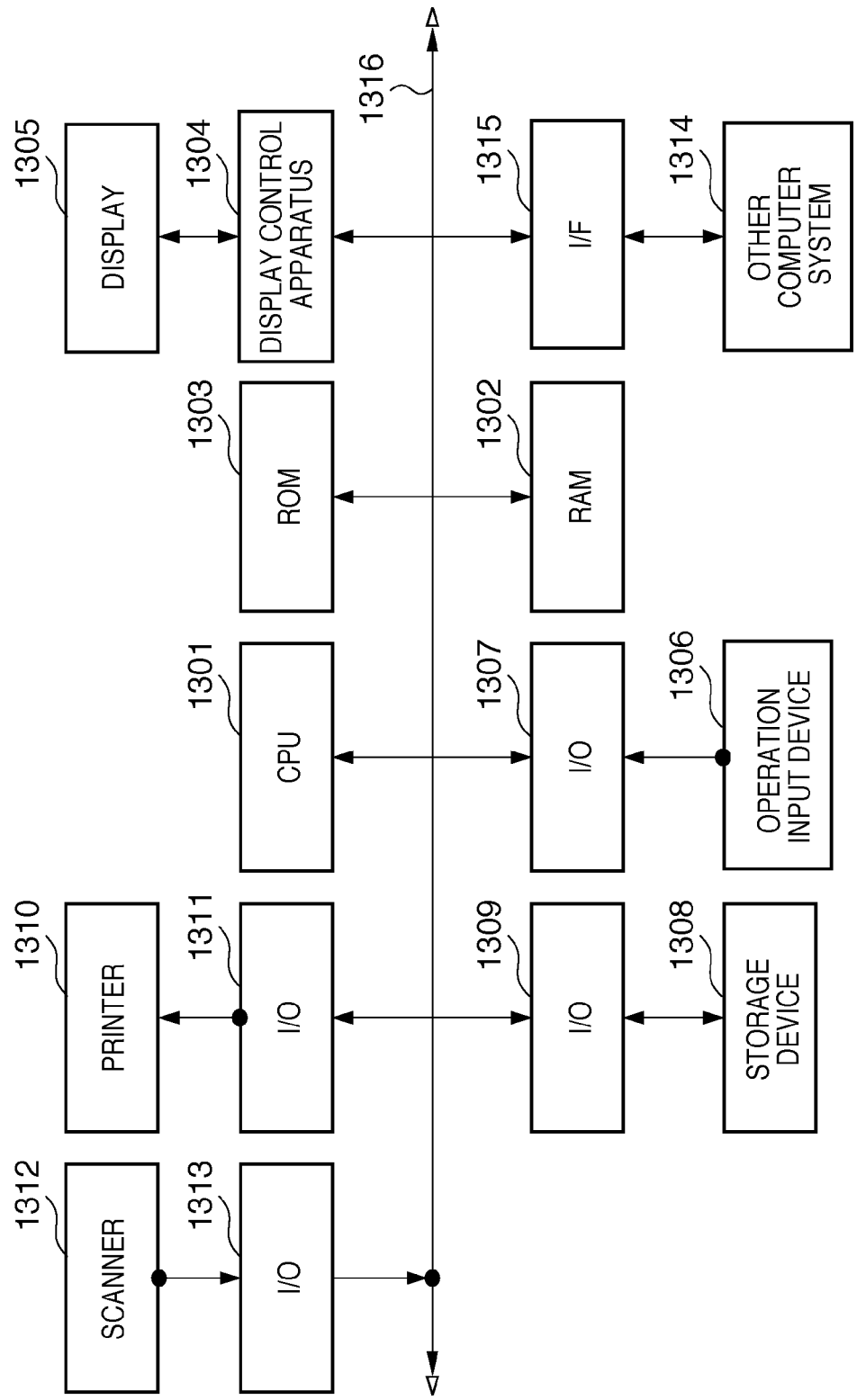
FIG. 13 is a block diagram illustrating a basic configuration of a computer system according to a fourth embodiment.

FIG. 13 is a block diagram illustrating a basic configuration of a computer system according to the fifth embodiment. In order for this computer system to execute all the functions described in the aforementioned embodiments, each functional configuration is described in a program and the computer system reads that program.

In FIG. 13, reference numeral 1301 denotes a CPU that controls the entire system using programs or data stored in a RAM 1302 or a ROM 1303 as well as performing the processing described in the aforementioned embodiments. Reference numeral 1302 denotes a RAM that includes an area in which programs or data that have been loaded from an external memory 1308 or that have been downloaded from the other computer system 1314 over an I/F (interface) 1315 are temporarily stored. The RAM 1302 also includes a working area required for the CPU 1301 to perform various processes. Reference numeral 1303 denotes a ROM that stores functional programs, settings data, and the like that are used in a computer system.

Reference numeral 1304 denotes a display control apparatus that performs control for causing a display 1305 to display images, characters, or the like. Reference numeral 1305 denotes a display that displays images, characters, or the like. Note that the display 1305 may be a cathode-ray tube, a liquid crystal screen, or the like, for example. Reference numeral 1306 denotes an operation input device that consists of any device such as a keyboard or a mouse that can input various user instructions into the CPU 1301. Reference numeral 1307 denotes an I/O that communicates various instructions or the like that have been input with the operation input device 1306 to the CPU 1301. Reference numeral 1308 denotes an external memory that serves as a mass storage information device such as a hard disk, and stores an OS (operating system) or programs for causing the CPU 1301 to execute the processing described in the above embodiments, input and output original images, and the like. The writing of information to the external memory 1308 or the reading of information from the external memory 1308 is performed through an I/O 1309.

Reference numeral 1310 denotes a printer for printing and outputting a document or an image, and its output data is transmitted through an I/O 1311 from the RAM 1302 or the external memory 1308. Note that the printer 1310 may be an inkjet printer, a laser beam printer, a thermal transfer printer, or a dot-impact printer, for example. Reference numeral 1312 denotes a scanner for reading a document or an image, and its input data is transmitted through an I/O 1313 to the RAM 1302 or the external memory 1308. Reference numeral 1316 denotes a bus that connects the CPU 1301, the ROM 1303, the RAM 1302, the I/O 1311, the I/O 1309, the display control apparatus 1304, the I/F 1315, the I/O 1307, and the I/O 1313.

As described above, according to the fifth embodiment, the determination of the presence or absence of character-spacing watermark information and accordingly the watermark information detection processing described in the above first to fourth embodiments can be realized by a computer system.

Note that, while the fifth embodiment provides an example in which the program for realizing the functions of the above-described first to fourth embodiments is prepared and executed under the control of the CPU 1301, some functions may be realized by a dedicated hardware circuit or the like. Such a dedicated hardware circuit may be a device such as the scanner 1312 or the printer 1310 that is provided in an external apparatus.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-274869 filed on Oct. 24, 2008 and No. 2009-175801 filed on Jul. 28, 2009, which are hereby incorporated by reference herein in their entirety.

What is claimed is:

1. A document processing apparatus that determines whether or not a document image has watermark information embedded therein by use of character spacing, comprising:
    an input unit for inputting a document image;

a character-spacing value extraction unit for extracting character spacing values in the document image;

a calculation unit for calculating fluctuations in the character spacing values; and a determination unit for determining whether or not the document image has watermark information embedded therein by comparing a value of the fluctuations calculated by the calculation unit with a preset threshold value.

2. The document processing apparatus according to claim 1, wherein the character-spacing value extraction unit extracts a preset number of character spacing values.

3. The document processing apparatus according to claim 2, wherein the preset number of character spacing values to be extracted by the character-spacing value extraction unit is a multiple of two.

4. The document processing apparatus according to claim 1, wherein the calculation unit obtains a difference between each single pair of character spacing values and calculates fluctuations in the differences obtained for the respective pairs.

5. The document processing apparatus according to claim 4, wherein the determination unit determines the document image as having watermark information embedded therein when the value of the fluctuations is lower than the threshold value and an average of the differences obtained for the respective pairs is within a preset range.

6. The document processing apparatus according to claim 5, wherein the calculation unit obtains an average of a preset number of differences and calculates the fluctuations using the average.

7. The document processing apparatus according to claim 5, wherein the calculation unit excludes a difference that is higher than a preset adequate-difference threshold value from the differences obtained for the respective pairs.

8. The document processing apparatus according to claim 1, wherein the determination unit determines the document image as having watermark information embedded therein when the value of the fluctuations is lower than the threshold value.

9. The document processing apparatus according to claim 1, further comprising a watermark information extraction unit that extracts watermark information when the determination unit has determined the document image as having the watermark information embedded therein.

10. The document processing apparatus according to claim 1, wherein the calculation unit calculates a variance for the fluctuations.

11. The document processing apparatus according to claim 1, wherein the calculation unit calculates either a deviation or a standard deviation for the fluctuations.

12. The document processing apparatus according to claim 1, further comprising:

a control unit for controlling an output of the document image based on a result of the determination performed by the determination unit; and a display unit for displaying contents of control by the control unit.

13. The document processing apparatus according to claim 1, further comprising:

a print unit for printing a document image that has, as the watermark information, watermark information for tracking an information leak embedded therein, wherein, when as a result of the determination performed by the determination unit, the document image input by the input unit is determined as including the watermark information for tracking an information leak, the watermark information for tracking an information leak is extracted and analyzed so as to specify a source of a leak of the document image.

14. A document processing method for determining whether or not a document image has watermark information embedded therein by use of character spacing, comprising:

an input step of inputting a document image;

a character-spacing value extraction step of extracting character spacing values in the document image;

a calculation step of calculating fluctuations in the character spacing values; and a determination step of determining whether or not the document image has watermark information embedded therein by comparing a value of the fluctuations calculated in the calculation step with a preset threshold value.

15. A non-transitory computer-readable recording medium that stores a program that, when executed by a computer, causes the computer to perform a document processing method for determining whether or not a document image has watermark information embedded therein by use of character spacing, the method comprising:

an input step of inputting a document image;

a character-spacing value extraction step of extracting character spacing values in the document image;

a calculation step of calculating fluctuations in the character spacing values; and a determination step of determining whether or not the document image has watermark information embedded therein by comparing a value of the fluctuations calculated by the calculation step with a preset threshold value.

* * * * *